(12) United States Patent
Balmakhtar et al.

(10) Patent No.: US 11,520,749 B1
(45) Date of Patent: Dec. 6, 2022

(54) CONSOLIDATION OF USER PLANE AND CONTROL PLANE REPORTS IN A 5G COMMUNICATION NETWORK

(71) Applicant: T-MOBILE INNOVATIONS LLC, Overland Park, KS (US)

(72) Inventors: Marouane Balmakhtar, Fairfax, VA (US); Lyle W. Paczkowski, Mission Hills, KS (US)

(73) Assignee: SPRINT COMMUNICATIONS COMPANY LP, Overland Park, KS (US)

( * ) Notice: Subject to any disclaimer, the term of this patent is extended or adjusted under 35 U.S.C. 154(b) by 338 days.

(21) Appl. No.: 16/793,872

(22) Filed: Feb. 18, 2020

(51) Int. Cl.
```
G06F 16/182    (2019.01)
G06F 16/18     (2019.01)
H04W 24/08     (2009.01)
H04L 5/00      (2006.01)
H04W 12/06     (2021.01)
G06F 9/455     (2018.01)
H04W 8/04      (2009.01)
```

(52) U.S. Cl.
CPC ...... *G06F 16/1824* (2019.01); *G06F 9/45558* (2013.01); *G06F 16/1805* (2019.01); *H04L 5/0055* (2013.01); *H04W 8/04* (2013.01); *H04W 12/06* (2013.01); *H04W 24/08* (2013.01); *G06F 2009/45595* (2013.01)

(58) Field of Classification Search
CPC ....... H04W 8/04; H04W 12/06; H04W 24/08; G06F 16/1824; G06F 16/1805; G06F 9/45558; H04L 63/105; H04L 63/123; H04L 41/40; H04L 41/5006; H04L 16/20; H04L 9/0643
See application file for complete search history.

(56) References Cited

U.S. PATENT DOCUMENTS

| | | | |
|---|---|---|---|
| 2018/0255463 A1* | 9/2018 | Zheng | H04W 16/02 |
| 2020/0313983 A1* | 10/2020 | Stammers | H04L 41/40 |
| 2020/0314648 A1* | 10/2020 | Cao | H04L 9/0643 |
| 2020/0351650 A1* | 11/2020 | Maria | H04L 9/3239 |
| 2020/0396601 A1* | 12/2020 | Maria | H04W 12/033 |
| 2021/0091994 A1* | 3/2021 | Meirosu | H04L 41/5006 |
| 2021/0127271 A1* | 4/2021 | Wu | H04W 28/0842 |
| 2021/0160314 A1* | 5/2021 | Parvataneni | H04L 9/3263 |
| 2021/0168050 A1* | 6/2021 | Sauer | H04L 63/123 |
| 2022/0021538 A1* | 1/2022 | Madisetti | H04L 63/105 |

* cited by examiner

*Primary Examiner* — Chi Ho A Lee
*Assistant Examiner* — Andrew Lee

(57) ABSTRACT

A method of performing a virtual network function (VNF) is disclosed. The method comprises forking a user plane process on a computer by a VNF process that executes on the computer, forking a control plane process on the computer by VNF process, adding blocks to a user plane blockchain by the user plane process that record user plane events, and adding blocks to a control plane blockchain by the control plane process that record control plane events. The method also comprises creating a first information package by the user plane process based on the user plane blockchain, self-terminating by the user plane process while passing the first package of information to the VNF process, creating a second information package by the control plane process based on the control plane blockchain, and self-terminating by the control plane process while passing the second package of information to the VNF process.

20 Claims, 12 Drawing Sheets

CONSOLIDATION OF USER PLANE AND CONTROL PLANE REPORTS IN A 5G COMMUNICATION NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditional wireless communication networks may employ server computers dedicated to different network functionality. For example, a first server or servers may be dedicated to performing authentication, authorization, and accounting (AAA) functions, A second server or servers may be dedicated to performing media gateway functions. A third server or servers may be dedicated to performing roaming functions. Because some of the network functions may encapsulate identical sub-functions, there may be some redundancies and resultant inefficiencies. Network function virtualization (NFV) breaks out the component sub-functions and makes them available in a virtual computing environment for any network function. For example, a first network function may be provided using a first sub-function, a second sub-function, a third sub-function. A second network function may be provided using a fourth sub-function, a fifth sub-function, and the second sub-function. A third network function may be provided using a sixth sub-function, the first sub-function, and the third sub-function. By appropriately linking processing among the five different sub-functions, computing efficiencies may be realized by NFV.

SUMMARY

In an embodiment, a method of performing a virtual network function in a fifth generation (5G) wireless communication network is disclosed. The method comprises initiating a virtual network function process on a computer system to provide a virtual network function in a 5G wireless communication network, creating a first block of a first blockchain associated with the virtual network function, wherein the first block of the first blockchain comprises microcode associated with a user plane of the virtual network function and microcode associated with a control plane of the virtual network function, creating a first block of a second blockchain associated with the user plane of the virtual network function, wherein the first block of the second blockchain comprises the microcode associated with the user plane, and creating a first block of a third blockchain associated with the control plane of the virtual network function, wherein the first block of the third blockchain comprises the microcode associated with the control plane. The method further comprises forking a user plane process on the computer system by the virtual network function process, wherein the virtual network function process provides the first block of the second blockchain to the user plane process as an initiation parameter and forking a control plane process on the computer system by the virtual network function process, where the virtual network function process provides the first block of the third blockchain to the control plane process as an initiation parameter. The method further comprises monitoring user plane events generated by the user plane process by a user plane monitoring routine, comparing the user plane events to a user plane event threshold by the user plane monitoring routine, wherein the user plane event threshold is defined by the microcode contained in the first block of the second blockchain, and adding blocks to the second blockchain that record the instances of user plane events exceeding the user plane event threshold. The method further comprises monitoring control plane events generated by the control plane process by a control plane monitoring routine, comparing the control plane events to a control plane event threshold by the control plane monitoring routine, wherein the control plane event threshold is defined by the microcode contained in the first block of the third blockchain, and adding blocks to the third blockchain that record the instances of control plane events exceeding the control plane event threshold. The method further comprises creating a first package of information by the user plane process based on the second blockchain and self-terminating by the user plane process while passing the first package of information to the virtual network function process. The method further comprises creating a second package of information by the control plane process based on the third blockchain and self-terminating by the control plane process while passing the second package of information to the virtual network function process. The method further comprises creating a terminal block of the first blockchain by the virtual network function process comprising the first package of information and the second package of information, storing the first blockchain by the virtual network function process, and self-terminating by the virtual network function process.

In another embodiment, a method of performing a virtual network function in a fifth generation (5G) wireless communication network is disclosed. The method comprises initiating a virtual network function process on a computer system to provide a virtual network function in a 5G wireless communication network, creating a first block of a first blockchain associated with the virtual network function, wherein the first block of the first blockchain comprises microcode associated with a user plane of the virtual network function and microcode associated with a control plane of the virtual network function, creating a first block of a second blockchain associated with the user plane of the virtual network function, wherein the first block of the second blockchain comprises the microcode associated with the user plane, and creating a first block of a third blockchain associated with the control plane of the virtual network function, wherein the first block of the third blockchain comprises the microcode associated with the control plane. The method further comprises forking a user plane process on the computer system by the virtual network function process, wherein the virtual network function process provides the first block of the second blockchain to the user plane process as an initiation parameter, forking a control plane process on the computer system by the virtual network function process, where the virtual network function process provides the first block of the third blockchain to the control plane process as an initiation parameter, adding blocks to the second blockchain by the user plane process based on the microcode contained in the first block of the second blockchain, and adding blocks to the third blockchain by the control plane process based on the microcode contained in the first block of the third blockchain. The method further comprises creating a first package of information by the user plane process based on the second blockchain, self-terminating by the user plane process while passing the first package of information to the virtual network function process, creating a second package of information by the control plane process based on the third blockchain, and self-terminating by the control plane process while passing the second package of information to the virtual network function process. The method further comprises creating a terminal block of the first blockchain by the virtual network function process comprising the first package of information and the second package of information, storing the first blockchain by the virtual network function process, and self-terminating by the virtual network function process.

In yet another embodiment, a method of performing a virtual network function on a computer system is disclosed. The method comprises initiating a virtual network function process on a computer system to provide a virtual network function, creating a first block of a first blockchain associated with the virtual network function, wherein the first block of the first blockchain comprises a date and time of initiation of the virtual network function, forking a user plane process on the computer system by the virtual network function process, wherein the virtual network function process provides a first block of a second blockchain to the user plane process as an initiation parameter, and forking a control plane process on the computer system by the virtual network function process, where the virtual network function process provides a first block of a third blockchain to the control plane process as an initiation parameter. The method further comprises adding blocks to the second blockchain by the user plane process that record user plane events, adding blocks to the third blockchain by the control plane process that record control plane events, creating a first package of information by the user plane process based on the second blockchain, and self-terminating by the user plane process while passing the first package of information to the virtual network function process. The method further comprises creating a second package of information by the control plane process based on the third blockchain, self-terminating by the control plane process while passing the second package of information to the virtual network function process, creating a terminal block of the first blockchain by the virtual network function process comprising the first package of information and the second package of information, storing the first blockchain by the virtual network function process, and self-terminating by the virtual network function process.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
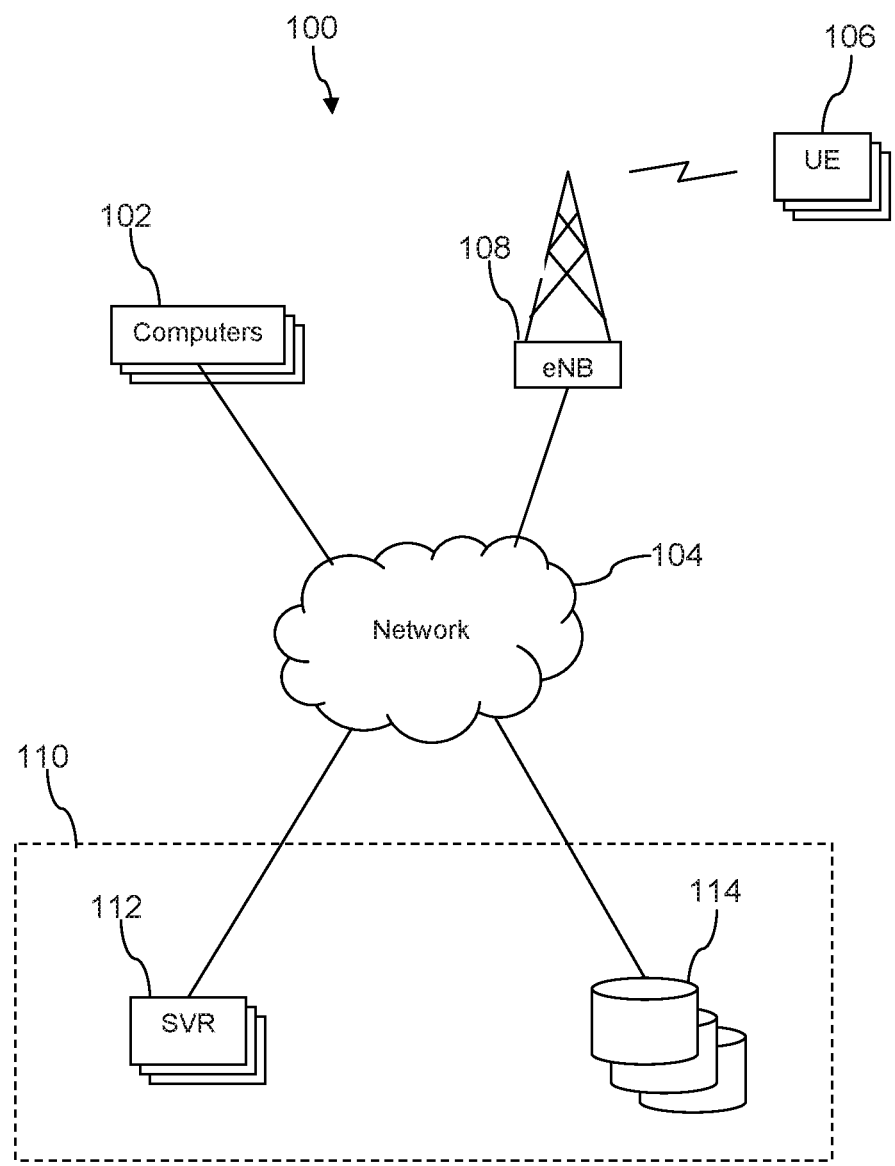
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It is thought that the fifth generation (5G) wireless communication network will employ network function virtualization (NFV) to gain efficiencies. Instances of virtual network functions (VNFs) may be instantiated as needed to bring up additional load handling for specific processing needs of the network and destroyed or terminated when the network loads decrease. For example, at a first time three instances of a first VNF may be instantiated and active, two instances of a second VNF may be instantiated and active, and four instances of a third VNF may be instantiated and active. At a second time, five instances of the first VNF may be instantiated and active, three instances of the second VNF may be instantiated and active, and two instances of the third VNF may be instantiated and active. At any given time, the same underlying hardware computing resources can be allocated to a first distribution of VNFs and at a later time, in response to changing network loads, these same computing resources can be allocated differently to a second distribution of VNFs that is more appropriate for the changed network loads. In some embodiments, network function virtualization may be implemented using container network functions (CNF) in a way similar to VNFs. A CNF may be separate from a VNF or may be embedded in a VNF. It is understood that the functionality described herein as being provided by VNFs may be provided by CNFs in one or more embodiments.

It is expected that these VNFs will be initiated as a single parent process that will then fork a first child process that provides user plane functionality associated with the VNF and fork a second child process that provides control plane functionality associated with the VNF. The user plane process and the control plane process are substantially independent processes that execute independently of the parent VNF process which itself lies relatively dormant while the user plane and control plane child processes do the heavy lifting for the parent VNF process. A problem arises as to how the user plane process and the control plane process may monitor events and pass a record of those events back to the parent process when they each terminate so these events can be analyzed and used to tune the 5G network going forwards.

The present disclosure teaches the parent VNF process arranging creation of a root block for a user plane blockchain and a root block for a control plane blockchain. When the parent VNF process forks the user plane child process it passes the root block for the user plane blockchain to the child, and the user plane child process adds blocks to that root block which capture events of the user plane process. When the parent VNF process forks the control plane child process it passes the root block of the control plane blockchain to the child, and the control plane child process adds blocks to that root block which capture events of the control plane process. When the user plane child process self-destructs or self-terminates it first packages the content of its event blocks into a data structure, returns this data structure to the parent VNF process, and then destroys itself. Likewise, when the control plane child process self-destructs or self-terminates, it first packages the content of its event blocks into a data structure, returns this data structure to the parent VNF process, and then destroys itself.

The parent process itself has a root block of a parent process blockchain. When the parent process receives the packages containing the data on the events of the user plane child process and the control plane child process, it consolidates this information in a single data structure, creates a terminal block for the parent process blockchain that contains this consolidated information, and adds this terminal block to cap-off or terminate the parent process blockchain. In an embodiment, the parent process blockchain comprises only the root block and the terminal block containing the consolidated information regarding the events in the user plane child process and the events in the control plane child process. The parent process stores its blockchain in a data store and then itself self-terminates or self-destructs. A network analysis function may process the blockchains of the terminated VNFs periodically to develop statistics on network performance and error rates and to derive adaptations of network operating parameters whereby to improve the network performance. The data collected by the user plane process and the control plane process may be correlated with each other based on date and timestamps associated with the data, and the adaptations of network operating parameters may be derived, at least in part, on the correlation of event data across associated user plane processes and control plane processes.

The root block of the VNF parent processes may comprise microcode and/or configuration parameters that the parent VNF process may pass to the child processes in initiation root blocks. For example, the root block of a VNF parent process may comprise microcode and/or configuration parameters associated with the user plane child process and microcode and/or configuration parameters associated with the control plane child process. When the VNF parent or a block foundry function in the core network builds the root block of the user plane child process, it builds into that root block the microcode and/or configuration parameters directed to the user plane child process. When the user plane child process executes, one of the things it does is execute the microcode contained in its root block and processes based in part on the configuration parameters provided in its root block. When the VNF parent or a block foundry function in the core network builds the root block of the control plane child process, it builds into that root block the microcode and/or configuration parameters directed to the control plane child process. When the control plane child process executes, one of the things it does is execute the microcode contained in its root block and processes based in part on the configuration parameters provided in its root block. When different instances of the same VNF are initiated, the microcode and/or configuration parameters built into the root blocks associated with the user plane and the control plane child processes may be different from other root blocks of other user plane and control plane child processes associated with different instances of the same VNF.

In an embodiment, each of the user plane process and the control plane process comprise an event monitoring routine that they each execute. The event monitoring routine may track a variety of different process events such as memory allocation, memory deallocation, data input, data output, counts of message types. The event monitoring routine may compare the tracked event information to thresholds configured by the information provided in the child process's root block when it is forked by the parent NFV process. When some tracked metric or key performance indicator exceeds a threshold, the child process adds an event block to its blockchain that contains a record of the particulars of this threshold exceeding event. In an embodiment, the child process requests that the event block be built on its behalf by a block foundry service accessed via an application programming interface (API) invoked by the child process. Alternatively, in an embodiment, the child process requests that the event block be built on its behalf by the parent VNF process. Alternatively, in an embodiment, the child process builds the event block itself. However the event block is built, it contains the information about the threshold exceeding event in the data field of the event block. An example of a threshold exceeding event may be a ratio of a number of NACK responses to a number of ACK responses received by the child process in response to messages the child process has sent exceeding a threshold defined in its root block. Another example of a threshold exceeding event may be a ratio of allocated heap memory to available heap memory exceeding a threshold defined in its root block.

While it is thought that this event reporting mechanism may be particularly useful in 5G networks in the NFV context, the present disclosure contemplates that this event reporting mechanism may provide various advantages in other computing contexts unconnected with 5G wireless communication networks. The event reporting mechanism described herein may be referred to in some contexts as consolidation of user plane and control plane reports. The teachings of the present disclosure can contribute to the efficient operation of the future wireless communication networks by enabling the monitoring and adapting of the operation parameters of the network. The present disclosure can be construed as describing an improved computer and/or computing system in that it provides an elegant mechanism for configuring separate processes for event reporting and for flowing collected event reports back to a data store for analysis and adaptation.

Turning now to FIG. 1, a communication system 100 is described. In an embodiment, the system 100 comprises a plurality of computers 102 communicatively coupled to a network 104, and a plurality of mobile communication devices (user equipments—UEs) 106 that are communicatively coupled to the network 104 via a wireless communication link provided by one or more cell sites (eNBs) 108. The computers 102 may comprise desktop computers, laptop computers, tablet computers, notebook computers, or server computers. Computer systems are discussed further hereinafter. The UEs 106 may comprise mobile phones, smart phones, personal digital assistants (PDAs), wearable computers, headset computers, laptop computers, tablet computers, or notebook computers. The system 100 may comprise any number of computers 102, of UEs 106, and cell sites 108.

The cell site 108 may provide a wireless communication link to the UEs 106 according to one or more of a fifth generation (5G), a long term evolution (LTE), a code division multiple access (CDMA), a global system for mobile communications (GSM), or other wireless telecommunication protocol. In an embodiment, some of the UEs 106 may be coupled to the network 104 by a wireless access point (WAP) that provides a wireless communication link to the UE 106, for example according to a WiFi communication protocol. In an embodiment, the network 104 comprises one or more public networks, one or more private networks, or a combination thereof.

In an embodiment, the system 100 further comprises a core network 110 of a communication service provider that comprises a plurality of server computers 112 and a plurality of data stores 114. The core network 110 may be considered part of the network 104 but is illustrated separately in FIG. 1 to promote pointing out some of the features of the present disclosure. The core network 110 may provide some of the underlying communications functions that support the communication services provided by the network 104 to the computers 102 and the UEs 106. The computers 102 may communicate with each other and/or with the UEs 106. Some of the computers 102 may be web servers, application servers, or content servers. The UEs 106 may communicate with each other via the network 104. The core network 110 may provide services to the network 104 such as authentication, authorization, accounting services, virtual private network (VPN) services, home location register (HLR) services, visitor location register (VLR) services, and others.

The server computers 112 may provide an execution environment for network function virtualization (NFV). For example, the server computers 112 may execute virtual machines, and a virtual network function (VNF) process may execute in some of the virtual machines. For example, a first virtual machine executing on a first server 112 may execute a first VNF process and a second virtual machine executing on the first server 112 may execute a second VNF process. Alternatively, the first virtual machine executing on the first server 112 may execute the first VNF process and the second virtual machine may execute on a second server 112 and execute the second VNF process. The first and second VNF processes may execute different sets of instructions. Alternatively, the first and second VNF processes may execute the same set of instructions: in other words, the first and second VNF processes may be two execution instances of the same set of computer instructions. Multiple instances of the same set of instructions may be instantiated to increase a load handling ability of the core network 110 for communication services associated with the specific VNF. The data stores 114 may store instructions for virtual machines and for VNFs. The data stores 114 may further store results generated by the VNFs executing in the VMs on the servers 112.

Figure 2:
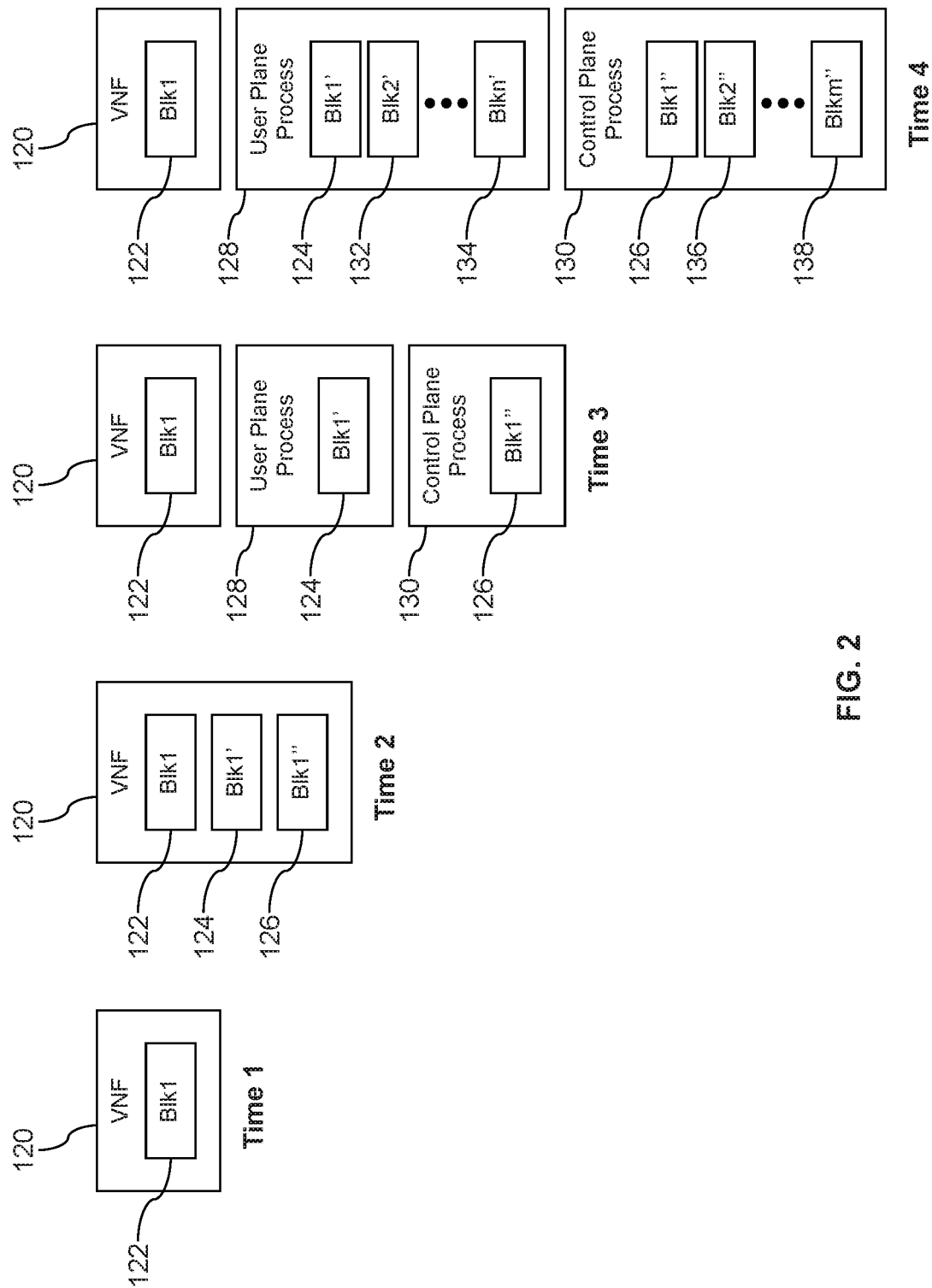
FIG. 2 is an illustration of computing processes according to an embodiment of the disclosure.

Turning now to FIG. 2, an example VNF parent process 120 is described. The VNF parent process 120 executes in a virtual machine that executes on one of the servers 112. Alternatively, the VNF parent process 120 executes directly on one of the servers 112. At a first time, the VNF parent process 120 comprises a root block 122 that is the root for a blockchain associated with the VNF parent process 120. The root block 122 comprises instructions and operational parameters for the VNF parent process 120. At a second time, the VNF parent process 120 generates a root block 124 for a user plane child process and a root block 126 for a control plane child process. The contents of the root block 124, 126 may be defined in the root block 122. In an embodiment, the parent process 120 sends the content from the root block 122 that comprises instructions and operational parameters for the root block 124 to a block foundry function in the core network 110 and receives back the first block 124 of the user plane child process. The parent, in that embodiment, also sends the content from the root block 122 that comprises instructions and operational parameters for the root block 126 to the block foundry function and receives back the first block 126 of the control plane child process.

At a third time, the VNF parent process 120 forks a user plane child process 128 and a control plane child process 130 at about the same time. In forking the user plane child process 128, the VNF parent process 120 provides the root block 124 as an initiation parameter to the user plane child process 128. The root block 124 serves as the root of a user plane blockchain. In forking the control plane child process 130, the VNF parent process 120 provides the root block 126 as an initiation parameter to the control plane child process 130, The root block 126 serves as a root of a control plane blockchain. After the forking of the child processes, the user plane process 128 executes, the control plane process 130 executes, and the VNF parent process 120 is largely dormant.

At a fourth time, the user plane process 128 adds event blocks 132, 134 to the user plane blockchain in response to operational metrics of the user plane process 128 exceeding predefined thresholds, for example thresholds defined in the root block 124. The user plane process 128 may request that a block creation service or the VNF parent process 120 create these event blocks on its behalf or it may create the event blocks itself. The control plane process 130 adds event blocks 136, 138 to the control plane blockchain in response to operational metrics of the control plane process 130 exceeding predefined thresholds, for example thresholds defined in the root block 126. The control plane process 130 may request that a block foundry function in the core network 110 or the VNF parent process 120 create these event blocks on its behalf or it may create the event blocks itself. The block chains of the VNF parent process 120, of the user plane process 128, and of the control plane process 130 are shown at a fourth time in FIG. 2.

Figure 3:
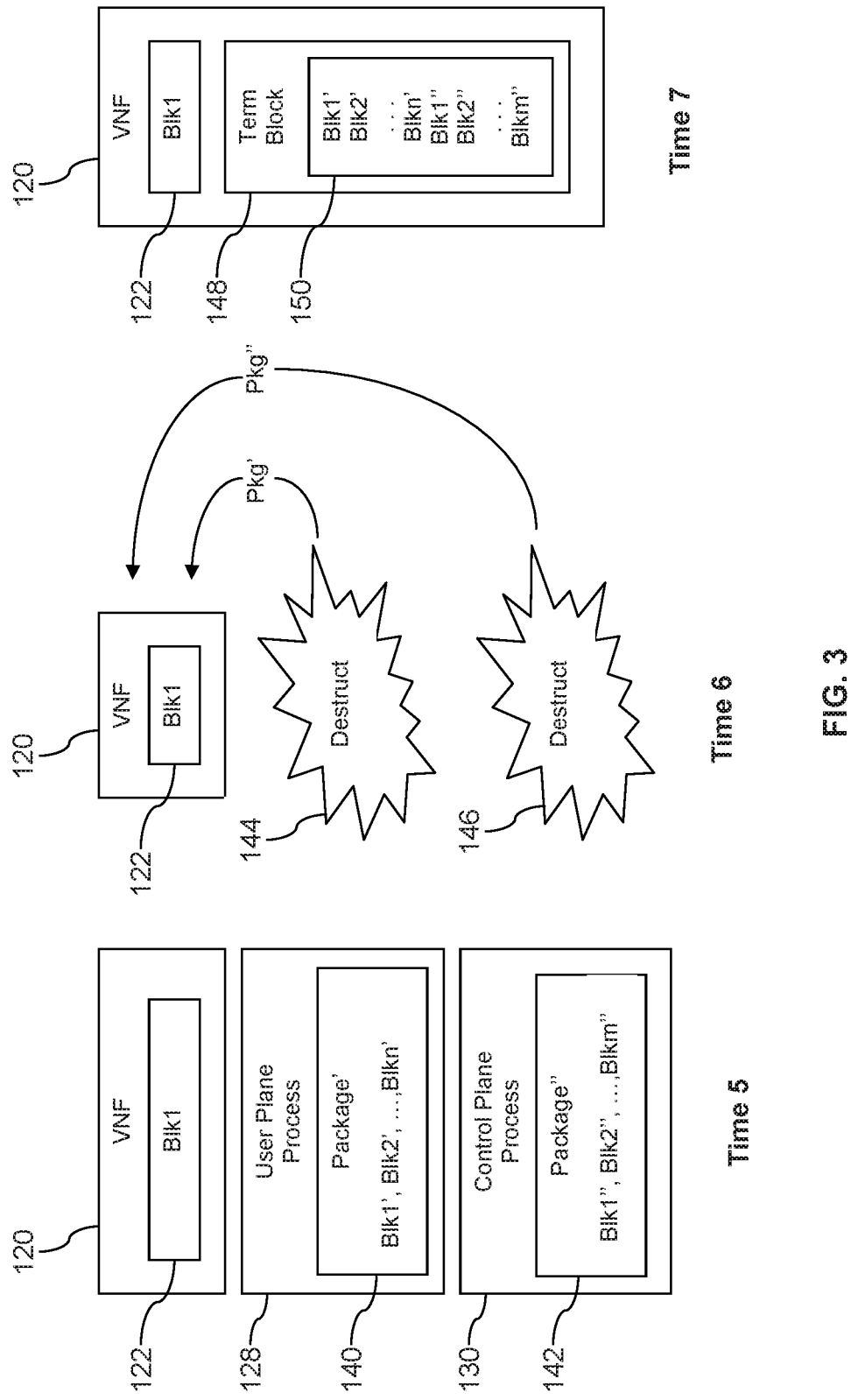
FIG. 3 is an illustration of computing processes according to an embodiment of the disclosure.

Turning now to FIG. 3, the completion and destruction of the child processes 128, 130 is described. At a fifth time, when the user plane child process 128 is ready to self-terminate or destroy itself, it creates a first package 140 that comprises the content of its blocks 124, 132, 134. The content that is stored in the first package 140 may not comprise the hashes and nonce values that are in the blocks 124, 132, 134 but only the data content or data payload of the blocks 124, 132, 134. The first package 140 may be referred to as a data structure in some contexts. The first package 140 may be a data blob. The first package 140 may be a comma separated list or file. When the control plane child process 130 is ready to self-terminate or destroy itself, it creates a second package 142 that comprises the content of its blocks 126, 136, 138. The second package 142 may be referred to as a data structure and may be a data blob or a comma separated list or file.

At a sixth time, when the user plane child process 128 destroys itself it passes the first package 140 back to the VNF parent process 120. When the control plane child process 130 destroys itself it passes the second package 142 back to the VNF parent process 120. At a seventh time, the VNF parent process 120 creates a terminal block 148 of the VNF parent blockchain. The terminal block 148 comprises the contents 150 of the first package 140 and of the second package 142 (e.g., the contents 150 comprises the aggregation of the first package 140 and the second package 142). Hence, the terminal block 148 comprises the reports of threshold exceedances of the user plane child process 128 and the reports of threshold exceedances of the control plane child process 130. The terminal block 148 further comprises the content of the root block of the user plane child process 128 and the content of the root block of the control plane child process 130. The VNF parent blockchain hence comprises its root block and its terminal block: two total blocks. The VNF parent process 120 may send its blockchain to be stored in one of the data stores 114 in the core network 110, The VNF parent process 120 may then destroy itself. In this way the VNF process—the user plane child process 128 and the control plane child process 130—monitors, captures, records, and reports events and threshold exceedances to the core network 110.

Figure 4:
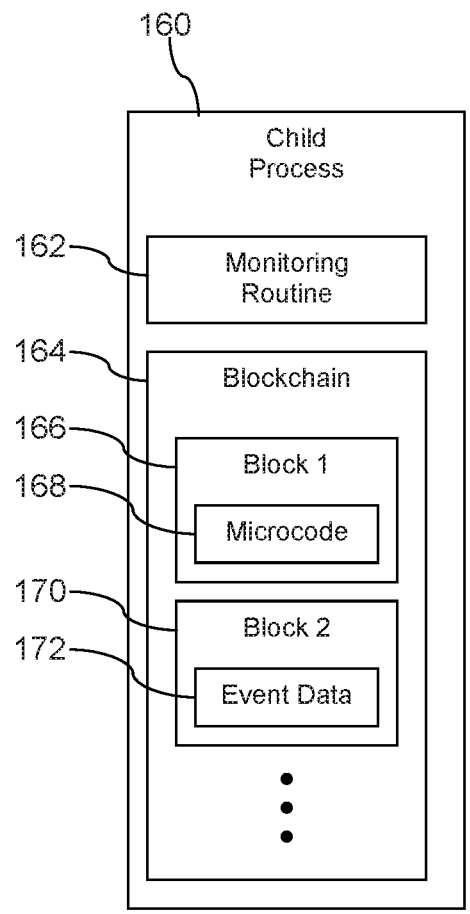
FIG. 4 is a block diagram of a computing process according to an embodiment of the disclosure.

Turning now to FIG. 4, a child process 160 is described. The child process 160 is substantially similar to the user plane child process 128 and to the control plane child process 130 with reference to what is shown in FIG. 4. The child process 160 comprises a monitoring routine 162 and a blockchain 164. The child process 160 may comprise additional routines or logic that is not shown, for example instructions that provide a communication function provided by the child process 160 in the VNF parent process 120. The monitoring routine 162 may monitor operational metrics associated with the child process 160 such as a CPU utilization, a data input rate, a data output rate, an amount of allocated heap memory, an amount of available heap memory, and other metrics. The operational metrics may comprise a count of a number NACK responses and a count of a number of ACK responses received by the child process 160 in response to messages the child process 160 has sent.

The blockchain 164 may be comprised of a root block 166 comprising microcode 168 that was provided as an initialization parameter to the child process 160 by the VNF parent process 120 when it forked the child process 160. The blockchain 164 may further be comprised of one or more event blocks 170 comprising event data 172. The monitoring routine 162 may accumulate counts of events and compare these counts to thresholds stored in the microcode 168. When an event count exceeds a threshold defined in the microcode 168, the child process 160 may add a new event block 170 to its blockchain 164 that stores information about the threshold exceeding metric.

The child process 160 may request the VNF parent process 120 to create the new event block 170 and return the new event block 170 to the child process 160, where the VNF parent process 120 creates the new event block 170 based on event data 172 the child process 160 provides with its request. The child process 160 may request a block foundry function in the core network 110 to create the new event block 170 and return the new event block 170 to the child process 160, where the block creation service creates the new event block 170 based on event data the child process 160 provides with its request. The child process 160 may itself create the new event block 170.

In an embodiment, the microcode 168 may further comprise instructions that the child process 160 executes when a performance metric threshold is exceeded. For example, when a particular performance metric threshold is exceeded, the microcode 168 may cause the child process 160 to self-terminate. For example, when a particular performance metric is exceeded, the microcode 168 may cause the child process 160 to change one or more of its configuration parameters, whereby to alter its performance statistics. Alternatively, the child process 160 may self-terminate in response to receiving a kill signal from the VNF parent process 120.

Figure 5A:
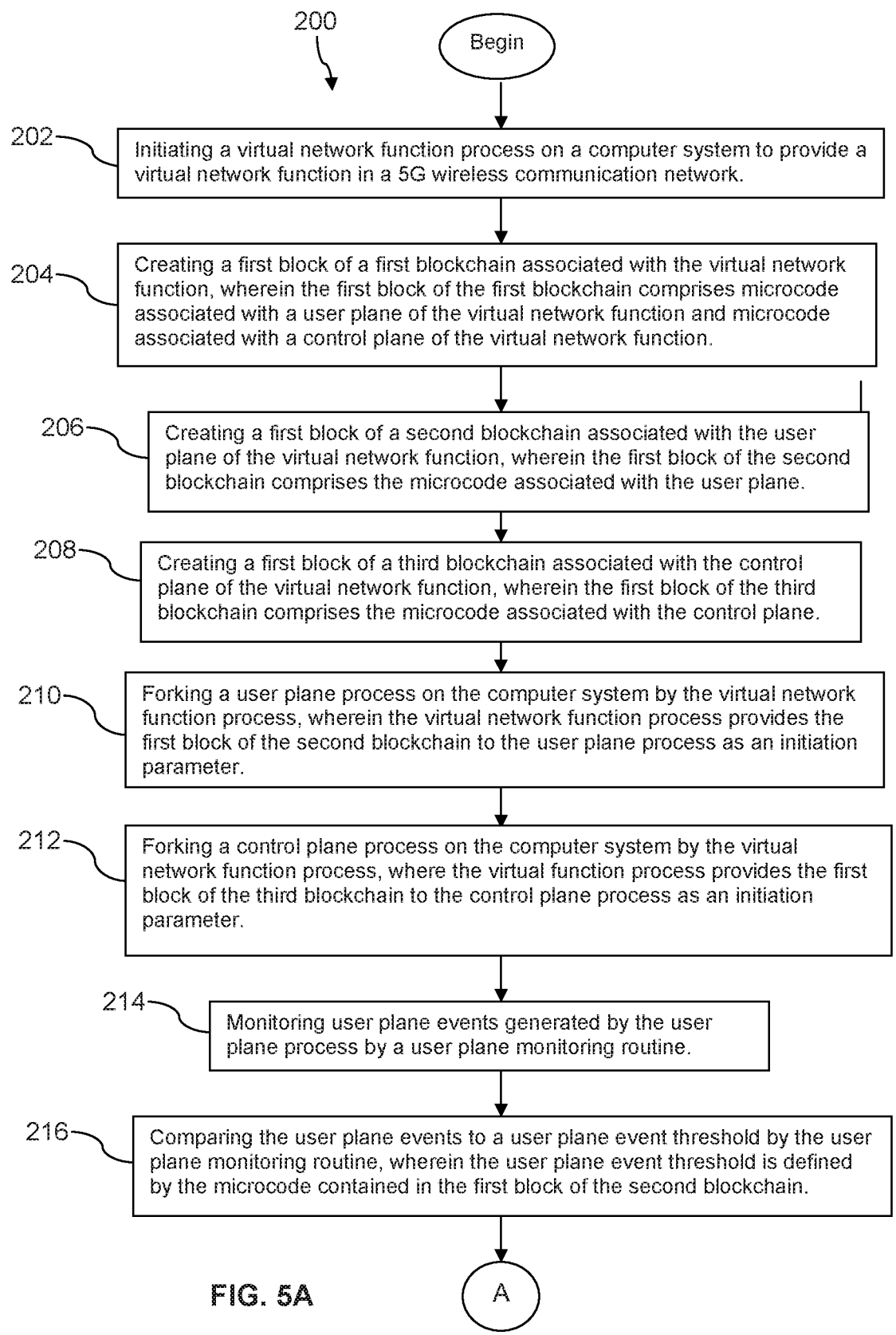
FIG. 5A, FIG. 5B, and FIG. 5C are a flow chart of a method according to an embodiment of the disclosure.
Figure 5B:
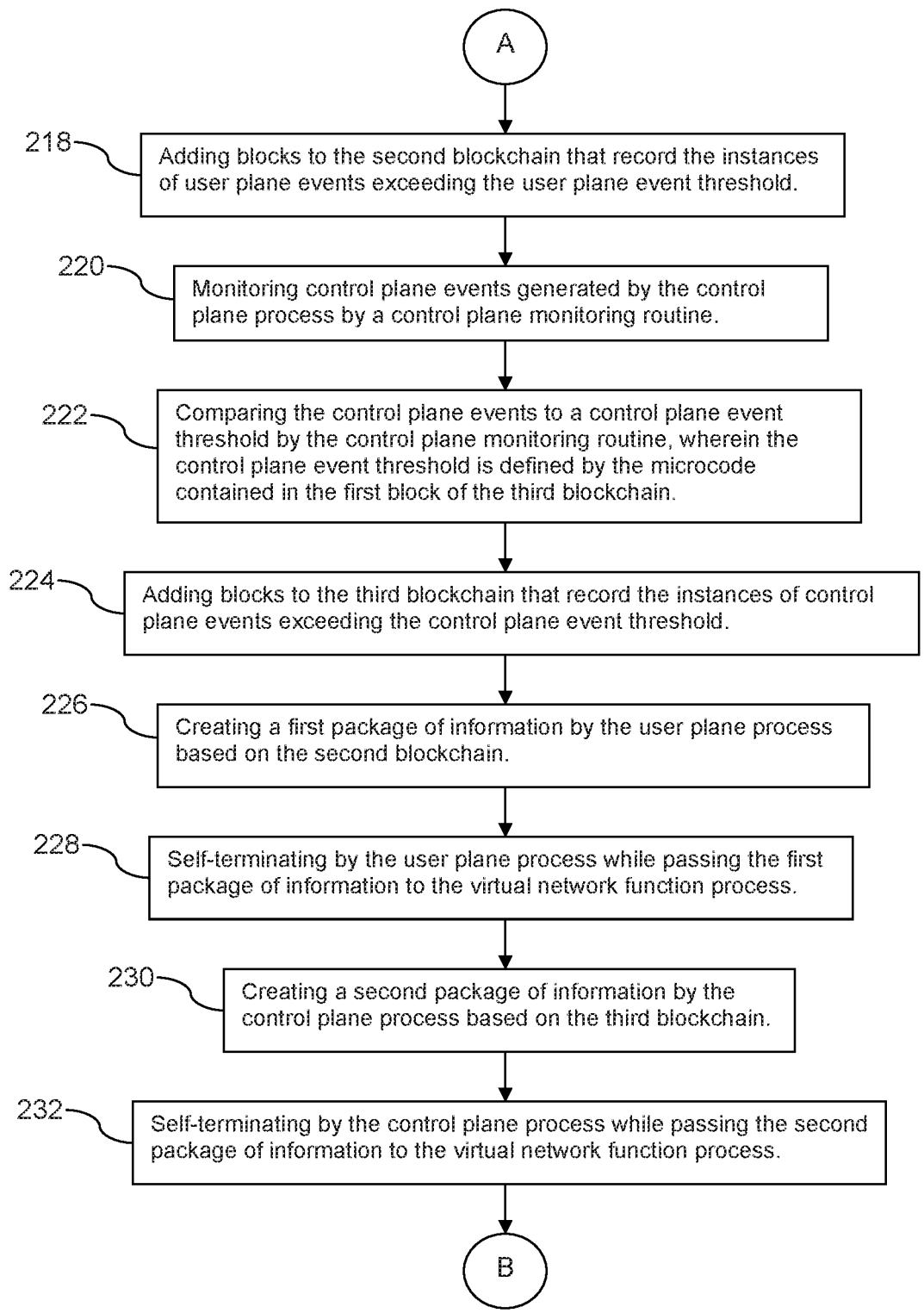
Figure 5C:
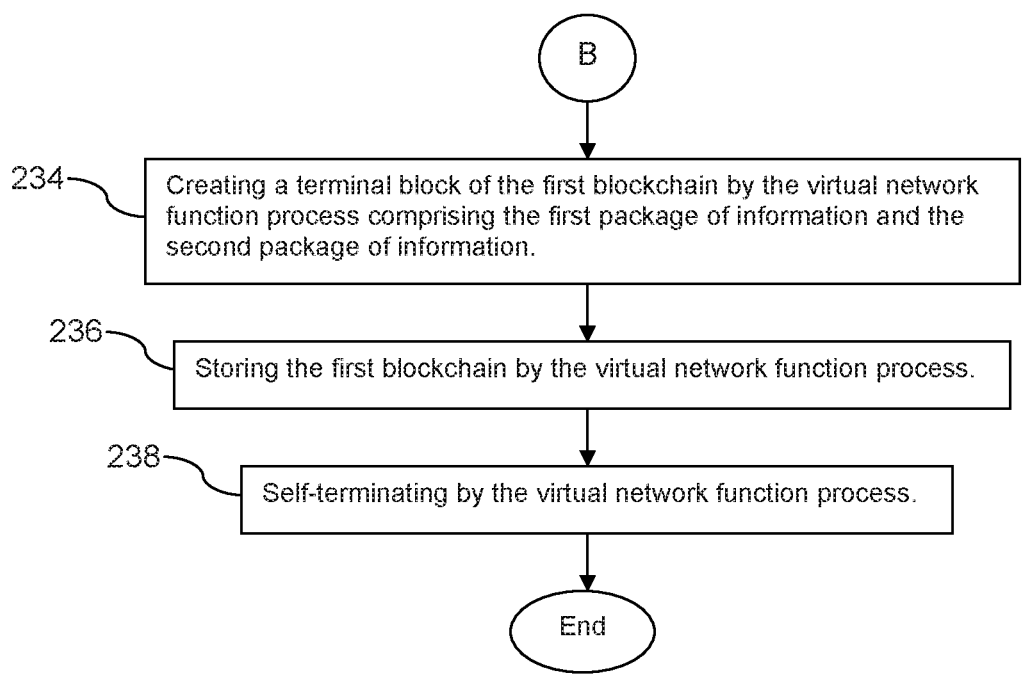

Turning now to FIG. 5A, FIG. 5B, and FIG. 5C, a method 200 is described. In an embodiment, the method 200 is a method of performing a virtual network function in a fifth generation (5G) wireless communication network. In an embodiment, the virtual network function may be an authentication function, an authorization function, an accounting function, a billing function, a virtual private network (VPN) function, a home location register (HLR) function, a visitor location register (VLR) function, or another function associated with providing wireless communication services by the core network 110. At block 202, the method 200 comprises initiating a virtual network function (VNF) process on a computer system to provide a virtual network function in a 5G wireless communication network. The initiation of the VNF process may occur because the core network 110 is experiencing increasing demand for the specific function provided by the VNF process. There may be several instances of the VNF process executing concurrently on servers 112 in the core network 110.

At block 204, the method 200 comprises creating a first block of a first blockchain associated with the virtual network function, wherein the first block of the first blockchain comprises microcode associated with a user plane of the virtual network function and microcode associated with a control plane of the virtual network function. The first block of the first blockchain may further comprise a date and time stamp associated with the initiation of the VNF process. At block 206, the method 200 comprises creating a first block of a second blockchain associated with the user plane of the virtual network function, wherein the first block of the second blockchain comprises the microcode associated with the user plane. At block 208, the method 200 comprises creating a first block of a third blockchain associated with the control plane of the virtual network function, wherein the first block of the third blockchain comprises the microcode associated with the control plane.

The first block of the second blockchain and the first block of the third blockchain may comprise a date and time stamp. In an embodiment, the first block of the second blockchain and the first block of the third blockchain may be created by a block foundry function in the core network 110. Alternatively, the first block of the second blockchain and the first block of the third blockchain may be created by the VNF process.

At block 210, the method 200 comprises forking a user plane process on the computer system by the virtual network function process, wherein the virtual network function process provides the first block of the second blockchain to the user plane process as an initiation parameter. At block 212, the method 200 comprises forking a control plane process on the computer system by the virtual network function process, where the virtual network function process provides the first block of the third blockchain to the control plane process as an initiation parameter. In some contexts, the VNF process may be referred to as a patent process (e.g., a VNF parent process) and the user plane process and the control plane process may be referred to as child processes (e.g., a user plane child process and a control plane child process).

At block 214, the method 200 comprises monitoring user plane events generated by the user plane process by a user plane monitoring routine. At block 216 the method 200 comprises comparing the user plane events to a user plane event threshold by the user plane monitoring routine, wherein the user plane event threshold is defined by the microcode contained in the first block of the second blockchain. At block 218, the method 200 comprises adding blocks to the second blockchain that record the instances of user plane events exceeding the user plane event threshold. The blocks added to the second blockchain may comprise information such as a date and time stamp. Some blocks may be added to the second blockchain even when no event threshold is exceeded, for example blocks may be added simply to record performance metrics or counts of activities. The event blocks may be created by a block foundry executing on a server 112 in the core network 110, by the VNF process, or by the user plane process.

At block 220, the method 200 comprises monitoring control plane events generated by the control plane process by a control plane monitoring routine. At block 222, the method 200 comprises comparing the control plane events to a control plane event threshold by the control plane monitoring routine, wherein the control plane event threshold is defined by the microcode contained in the first block of the third blockchain. At block 224, the method 200 comprises adding blocks to the third blockchain that record the instances of control plane events exceeding the control plane event threshold. The blocks added to the third blockchain may comprise information such as a date and time stamp. Some blocks may be added to the third blockchain even when no event threshold is exceeded, for example blocks may be added simply to record performance metrics or counts of activities. The event blocks may be created by a block foundry executing on a server 112 in the core network 110, by the VNF process, or by the control plane process.

At block 226, the method 200 comprises creating a first package of information by the user plane process based on the second blockchain. In an embodiment, contextual information may be added to the first package of information that does not derive from the second blockchain, for example a data and time stamp when the first package of information is created and/or an identity of the user plane process. At block 228, the method 200 comprises self-terminating by the user plane process while passing the first package of information to the virtual network function process.

At block 230, the method 200 comprises creating a second package of information by the control plane process based on the third blockchain. In an embodiment, contextual information may be added to the second package of information that does not derive from the third blockchain, for example a data and time stamp when the second package of information is created and/or an identity of the control plane process. At block 232, the method 200 comprises self-terminating by the control plane process while passing the second package of information to the virtual network function process.

At block 234, the method 200 comprises creating a terminal block of the first blockchain by the virtual network function process comprising the first package of information and the second package of information. At block 236, the method 200 comprises storing the first blockchain by the virtual network function process. At block 238, the method 200 comprises self-terminating by the virtual network function process.

Figure 6A:
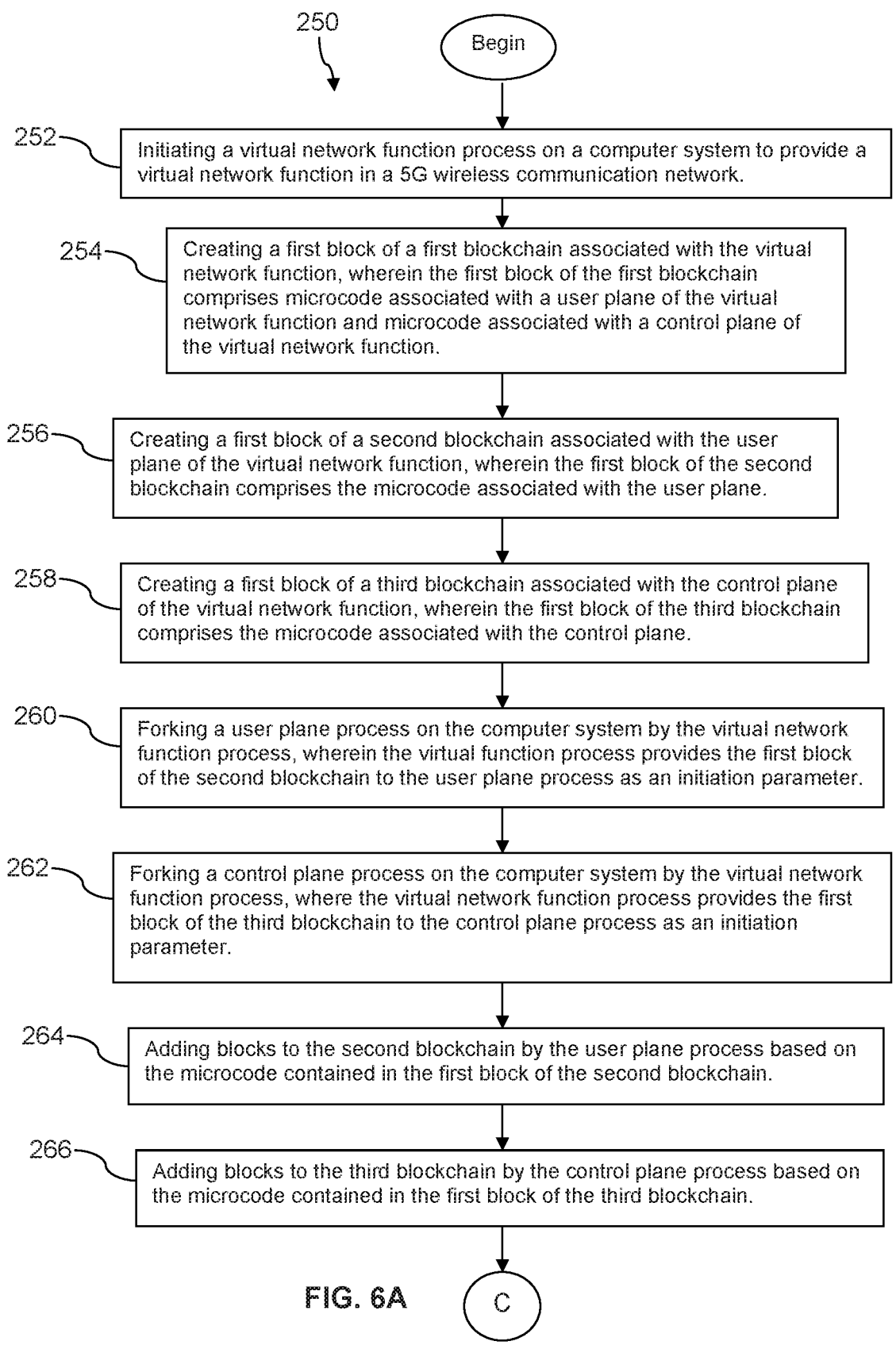
FIG. 6A and FIG. 6B are a flow chart of another method according to an embodiment of the disclosure.
Figure 6B:
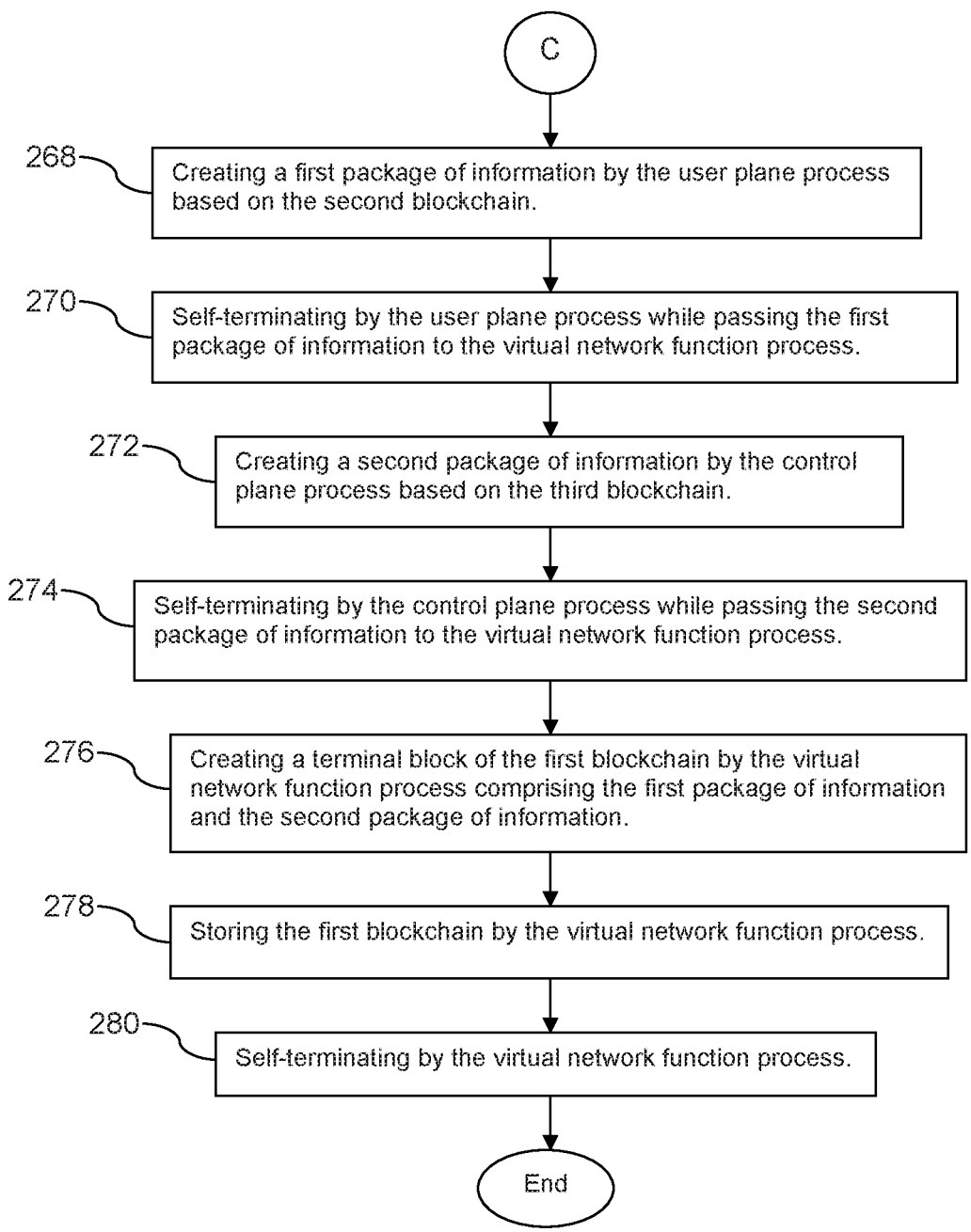

Turning now to FIG. 6A and FIG. 6B, a method 250 is described. In an embodiment, the method 250 is a method of performing a virtual network function in a fifth generation (5G) wireless communication network. At block 252, the method 250 comprises initiating a virtual network function process on a computer system to provide a virtual network function in a 5G wireless communication network.

At block 254, the method 250 comprises creating a first block of a first blockchain associated with the virtual network function, wherein the first block of the first blockchain comprises microcode associated with a user plane of the virtual network function and microcode associated with a control plane of the virtual network function. At block 256, the method 250 comprises creating a first block of a second blockchain associated with the user plane of the virtual network function, wherein the first block of the second blockchain comprises the microcode associated with the user plane. At block 258, the method 250 comprises creating a first block of a third blockchain associated with the control plane of the virtual network function, wherein the first block of the third blockchain comprises the microcode associated with the control plane.

At block 260, the method 250 comprises forking a user plane process on the computer system by the virtual network function process, wherein the virtual network function process provides the first block of the second blockchain to the user plane process as an initiation parameter. At block 262, the method 250 comprises forking a control plane process on the computer system by the virtual network function process, where the virtual network function process provides the first block of the third blockchain to the control plane process as an initiation parameter.

At block 264, the method 250 comprises adding blocks to the second blockchain by the user plane process based on the microcode contained in the first block of the second blockchain. At block 266, the method 250 comprises adding blocks to the third blockchain by the control plane process based on the microcode contained in the first block of the third blockchain.

At block 268, the method 250 comprises creating a first package of information by the user plane process based on the second blockchain. At block 270, the method 250 comprises self-terminating by the user plane process while passing the first package of information to the virtual network function process.

At block 272, the method 250 comprises creating a second package of information by the control plane process based on the third blockchain. At block 274, the method 250 comprises self-terminating by the control plane process while passing the second package of information to the virtual network function process.

At block 276, the method 250 comprises creating a terminal block of the first blockchain by the virtual network function process comprising the first package of information and the second package of information. At block 278, the method 250 comprises storing the first blockchain by the virtual network function process. At block 280, the method 250 comprises self-terminating by the virtual network function process.

Figure 7A:
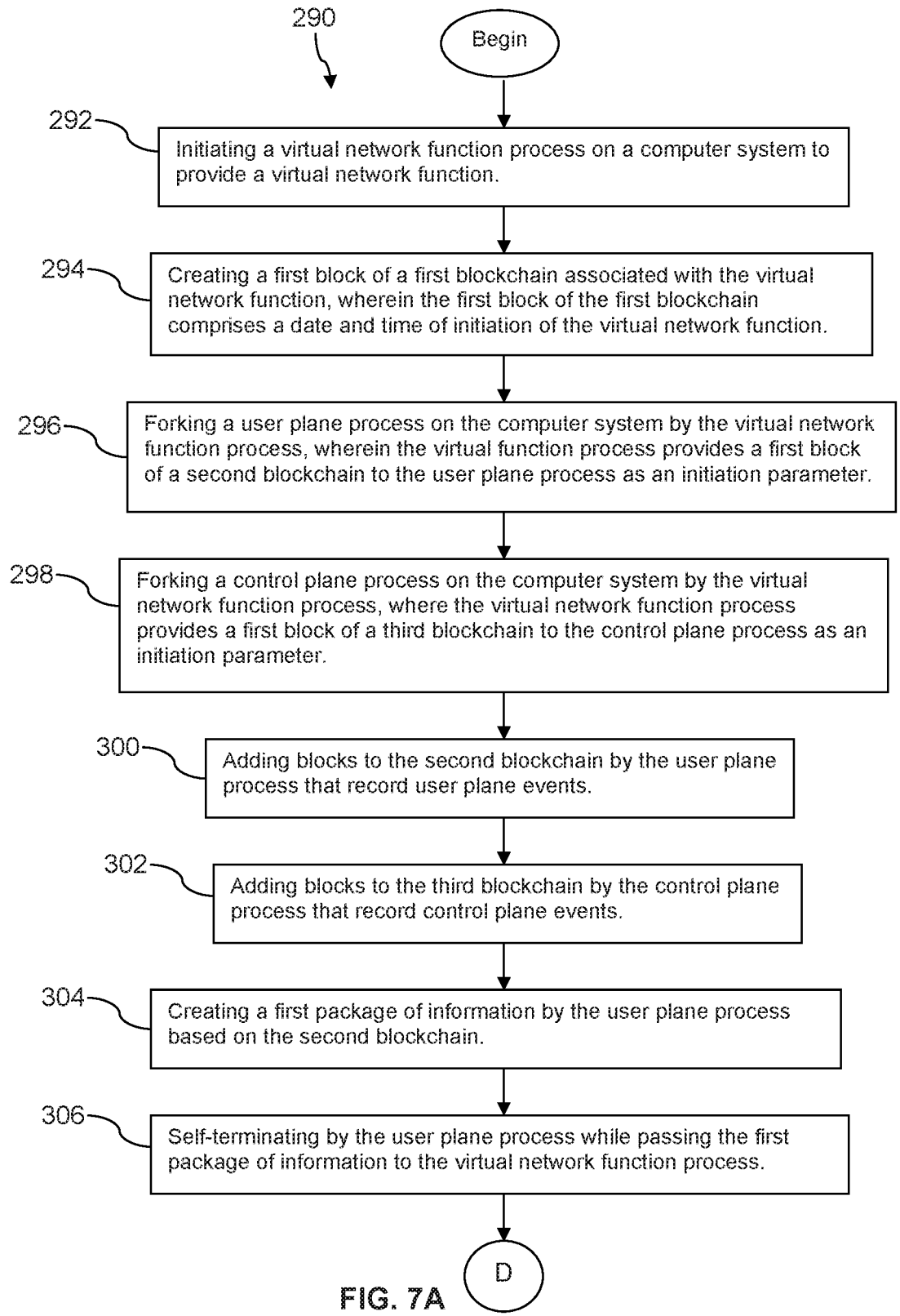
FIG. 7A and FIG. 7B are a flow chart of yet another method according to an embodiment of the disclosure.
Figure 7B:
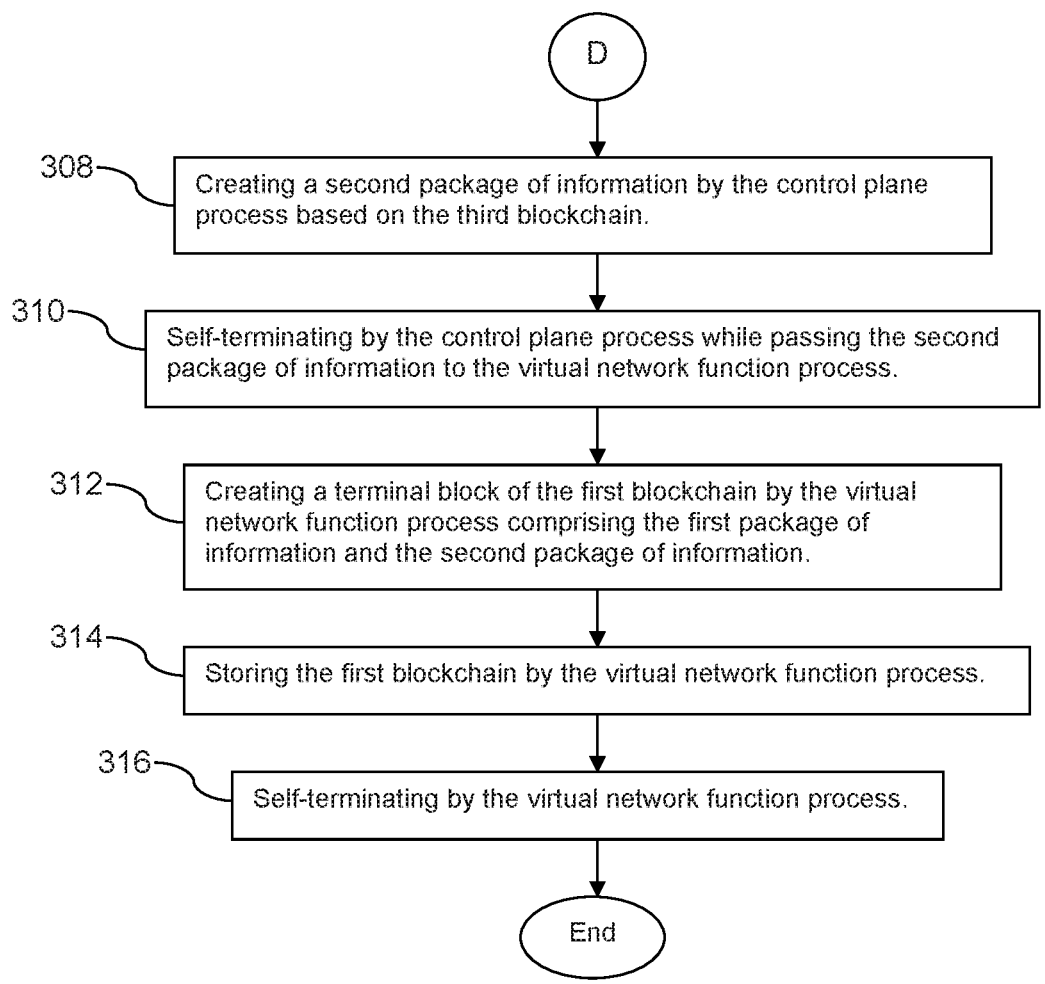

Turning now to FIG. 7A and FIG. 7B, a method 290 is described. In an embodiment, the method 290 is a method of performing a virtual network function on a computer system. At block 292, the method 290 comprises initiating a virtual network function process on a computer system to provide a virtual network function.

At block 294, the method 290 comprises creating a first block of a first blockchain associated with the virtual network function, wherein the first block of the first blockchain comprises a date and time of initiation of the virtual network function. At block 296, the method 290 comprises forking a user plane process on the computer system by the virtual network function process, wherein the virtual network function process provides a first block of a second blockchain to the user plane process as an initiation parameter. At block 298, the method 290 comprises forking a control plane process on the computer system by the virtual network function process, where the virtual network function process provides a first block of a third blockchain to the control plane process as an initiation parameter.

At block 300, the method 290 comprises adding blocks to the second blockchain by the user plane process that record user plane events. At block 302, the method 290 comprises adding blocks to the third blockchain by the control plane process that record control plane events.

At block 304, the method 290 comprises creating a first package of information by the user plane process based on the second blockchain. At block 306, the method 290 comprises self-terminating by the user plane process while passing the first package of information to the virtual network function process.

At block 308, the method 290 comprises creating a second package of information by the control plane process based on the third blockchain. At block 310 the method 290 comprises self-terminating by the control plane process while passing the second package of information to the virtual network function process.

At block 312, the method 290 comprises creating a terminal block of the first blockchain by the virtual network function process comprising the first package of information and the second package of information. At block 314, the method 290 comprises storing the first blockchain by the virtual network function process. At block 316, the method 290 comprises self-terminating by the virtual network function process.

Figure 8:
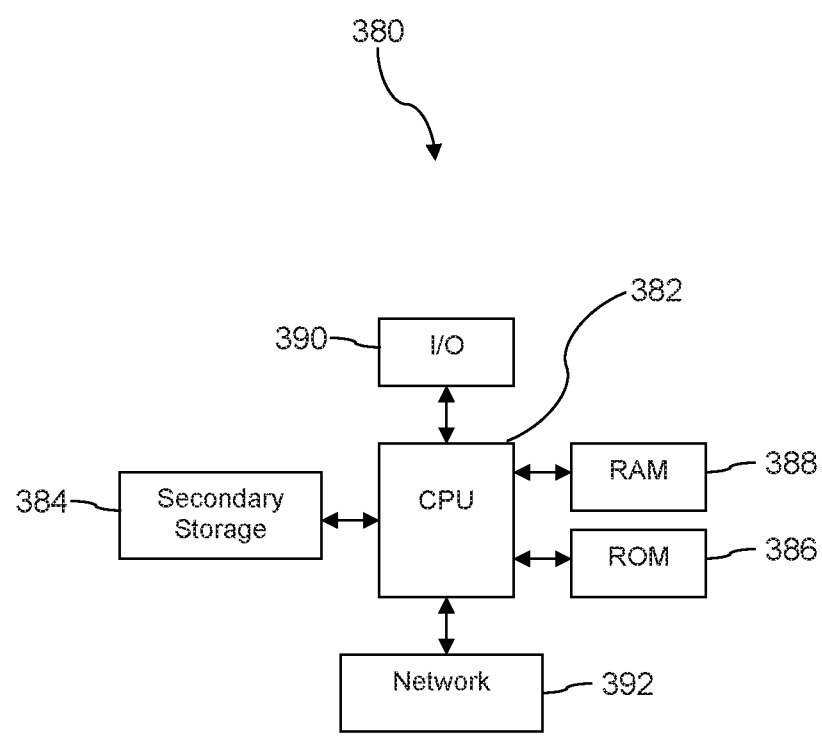
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplexing (TDM), data over cable system interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identification (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 80 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing a virtual network function in a fifth generation (5G) wireless communication network, comprising:

initiating a virtual network function process on a computer system to provide a virtual network function in a 5G wireless communication network;

creating a first block of a first blockchain associated with the virtual network function, wherein the first block of the first blockchain comprises microcode associated with a user plane of the virtual network function and microcode associated with a control plane of the virtual network function;

creating a first block of a second blockchain associated with the user plane of the virtual network function, wherein the first block of the second blockchain comprises the microcode associated with the user plane;

creating a first block of a third blockchain associated with the control plane of the virtual network function, wherein the first block of the third blockchain comprises the microcode associated with the control plane;

forking a user plane process on the computer system by the virtual network function process, wherein the virtual network function process provides the first block of the second blockchain to the user plane process as an initiation parameter;

forking a control plane process on the computer system by the virtual network function process, where the virtual network function process provides the first block of the third blockchain to the control plane process as an initiation parameter;

monitoring user plane events generated by the user plane process by a user plane monitoring routine;

comparing the user plane events to a user plane event threshold by the user plane monitoring routine, wherein the user plane event threshold is defined by the microcode contained in the first block of the second blockchain;

adding blocks to the second blockchain that record the instances of user plane events exceeding the user plane event threshold;

monitoring control plane events generated by the control plane process by a control plane monitoring routine;

comparing the control plane events to a control plane event threshold by the control plane monitoring routine, wherein the control plane event threshold is defined by the microcode contained in the first block of the third blockchain;

adding blocks to the third blockchain that record the instances of control plane events exceeding the control plane event threshold;

creating a first package of information by the user plane process based on the second blockchain;

self-terminating by the user plane process while passing the first package of information to the virtual network function process;

creating a second package of information by the control plane process based on the third blockchain;

self-terminating by the control plane process while passing the second package of information to the virtual network function process;

creating a terminal block of the first blockchain by the virtual network function process comprising the first package of information and the second package of information;

storing the first blockchain by the virtual network function process; and self-terminating by the virtual network function process.

2. The method of claim 1, wherein the virtual network function is an authentication function.

3. The method of claim 1, wherein the virtual network function is an authorization function.

4. The method of claim 1, wherein the virtual network function is one of a billing or an accounting function.

5. The method of claim 1, wherein the virtual network function is one of a home location register (HLR) function or a visitor location register (VLR) function.

6. The method of claim 1, wherein the user plane events comprise collection of at least one of a CPU utilization, a data input rate, a data output rate, an amount of allocated heap memory, an amount of available heap memory, a number of ACK messages received in response to sent messages, or a number of NACK messages received in response to sent messages.

7. The method of claim 1, wherein the control plane events comprise collection of at least one of a CPU utilization, a data input rate, a data output rate, an amount of allocated heap memory, an amount of available heap memory, a number of ACK messages received in response to sent messages, or a number of NACK messages received in response to sent messages.

8. A method of performing a virtual network function in a fifth generation (5G) wireless communication network, comprising:

initiating a virtual network function process on a computer system to provide a virtual network function in a 5G wireless communication network;

creating a first block of a first blockchain associated with the virtual network function, wherein the first block of the first blockchain comprises microcode associated with a user plane of the virtual network function and microcode associated with a control plane of the virtual network function;

creating a first block of a second blockchain associated with the user plane of the virtual network function, wherein the first block of the second blockchain comprises the microcode associated with the user plane;

creating a first block of a third blockchain associated with the control plane of the virtual network function, wherein the first block of the third blockchain comprises the microcode associated with the control plane;

forking a user plane process on the computer system by the virtual network function process, wherein the virtual network function process provides the first block of the second blockchain to the user plane process as an initiation parameter;

forking a control plane process on the computer system by the virtual network function process, where the virtual network function process provides the first block of the third blockchain to the control plane process as an initiation parameter;

adding blocks to the second blockchain by the user plane process based on the microcode contained in the first block of the second blockchain;

adding blocks to the third blockchain by the control plane process based on the microcode contained in the first block of the third blockchain;

creating a first package of information by the user plane process based on the second blockchain;

self-terminating by the user plane process while passing the first package of information to the virtual network function process;

creating a second package of information by the control plane process based on the third blockchain;

self-terminating by the control plane process while passing the second package of information to the virtual network function process;

creating a terminal block of the first blockchain by the virtual network function process comprising the first package of information and the second package of information;

storing the first blockchain by the virtual network function process; and self-terminating by the virtual network function process.

9. The method of claim 8, wherein the first blockchain comprises only the first block of the first blockchain and the terminal block of the first blockchain when the virtual network function process self-terminates.

10. The method of claim 8, wherein the user plane process is a child process of the virtual network function process and the control plane process is a child process of the virtual network function process.

11. The method of claim 8, wherein the blocks added to the second blockchain and the blocks added to the third blockchain are created by the virtual network function process.

12. The method of claim 8, wherein the blocks added to the second blockchain and the blocks added to the third blockchain are created by a block foundry function of the 5G wireless communication network.

13. The method of claim 8, wherein the virtual network function is one of an authentication function, an authorization function, a billing function, or an accounting function.

14. The method of claim 8, wherein the virtual network function is one of a home location register (HLR) function or a visitor location register (VLR) function.

15. A method of performing a virtual network function on a computer system, comprising:

initiating a virtual network function process on a computer system to provide a virtual network function;

creating a first block of a first blockchain associated with the virtual network function, wherein the first block of the first blockchain comprises a date and time of initiation of the virtual network function;

forking a user plane process on the computer system by the virtual network function process, wherein the virtual network function process provides a first block of a second blockchain to the user plane process as an initiation parameter;

forking a control plane process on the computer system by the virtual network function process, where the virtual network function process provides a first block of a third blockchain to the control plane process as an initiation parameter;

adding blocks to the second blockchain by the user plane process that record user plane events;

adding blocks to the third blockchain by the control plane process that record control plane events;

creating a first package of information by the user plane process based on the second blockchain;

self-terminating by the user plane process while passing the first package of information to the virtual network function process;

creating a second package of information by the control plane process based on the third blockchain;

self-terminating by the control plane process while passing the second package of information to the virtual network function process;

creating a terminal block of the first blockchain by the virtual network function process comprising the first package of information and the second package of information;

storing the first blockchain by the virtual network function process; and self-terminating by the virtual network function process.

16. The method of claim 15, wherein the user plane events comprise collection of at least one of a CPU utilization, a data input rate, a data output rate, an amount of allocated heap memory, an amount of available heap memory, a number of ACK messages received in response to sent messages, or a number of NACK messages received in response to sent messages.

17. The method of claim 15, wherein the control plane events comprise collection of at least one of a CPU utilization, a data input rate, a data output rate, an amount of allocated heap memory, an amount of available heap memory, a number of ACK messages received in response to sent messages, or a number of NACK messages received in response to sent messages.

18. The method of claim 15, wherein the virtual network function is one of a home location register (HLR) function or a visitor location register (VLR) function.

19. The method of claim 15, wherein the virtual network function is one of a billing or an accounting function.

20. The method of claim 15, wherein the virtual network function is one of an authentication function or an authorization function.

* * * * *